(12) United States Patent
Hayashi

(10) Patent No.: US 6,350,182 B2
(45) Date of Patent: Feb. 26, 2002

(54) V-RIBBED BELT AND METHOD FOR FABRICATING THE SAME

(75) Inventor: Takehiro Hayashi, Hyogo (JP)

(73) Assignee: Bando Chemical Industries, Ltd. (JP)

( * ) Notice: Subject to any disclaimer, the term of this patent is extended or adjusted under 35 U.S.C. 154(b) by 0 days.

(21) Appl. No.: 09/839,362

(22) Filed: Apr. 23, 2001

Related U.S. Application Data

(62) Division of application No. 09/511,355, filed on Feb. 23, 2000.

(51) Int. Cl.$^7$ ............................................... B24B 19/11
(52) U.S. Cl. ........................................ 451/51; 451/188
(58) Field of Search ................... 451/51, 188; 474/251, 474/263, 237, 260, 265

(56) References Cited

U.S. PATENT DOCUMENTS

| | | | |
|---|---|---|---|
| 4,322,916 A | * | 4/1982 | Richmond .................. 451/188 |
| 4,773,895 A | | 9/1988 | Takami et al. |
| 4,883,448 A | * | 11/1989 | Kobayashi et al. ......... 474/260 |
| 4,944,717 A | | 7/1990 | Georget |
| 5,273,496 A | | 12/1993 | White, Jr. |
| 5,334,107 A | | 8/1994 | White, Jr. |
| 5,507,699 A | | 4/1996 | White, Jr. |
| 5,624,338 A | * | 4/1997 | Kawashima et al. ........ 474/263 |
| 5,738,571 A | | 4/1998 | Kitahama et al. |
| 6,103,349 A | * | 8/2000 | Matsumoto ................. 474/237 |

FOREIGN PATENT DOCUMENTS

EP            0338 873 A1      10/1989

\* cited by examiner

Primary Examiner—Robert A. Rose
(74) Attorney, Agent, or Firm—Nixon Peabody LLP; Thomas W. Cole

(57) ABSTRACT

A V-ribbed belt B has bottom and back faces each provided with a plurality of ribs 3, 4 of approximately trapezoidal section which extend in parallel with each other along the belt length. In order to suppressing a discrepancy between respective speed ratios of revolution transmitted from one pulley to the other in normal and reversed positions of the belt B, the belt B is adapted to have a difference of 2 mm or less between a bottom-face-side belt length when the bottom-face-side ribs 3 of the belt B are faced on an inner peripheral side thereof and a back-face-side belt length when the back-face-side ribs 4 of the belt B are faced on the inner peripheral side thereof. The center of a cord 2 embedded inside of the belt B is thereby positioned substantially in the middle of the belt thickness so that the cord 2 has equal distances from both the bottom face and back face of the belt B even if the belt B is in either position.

2 Claims, 10 Drawing Sheets

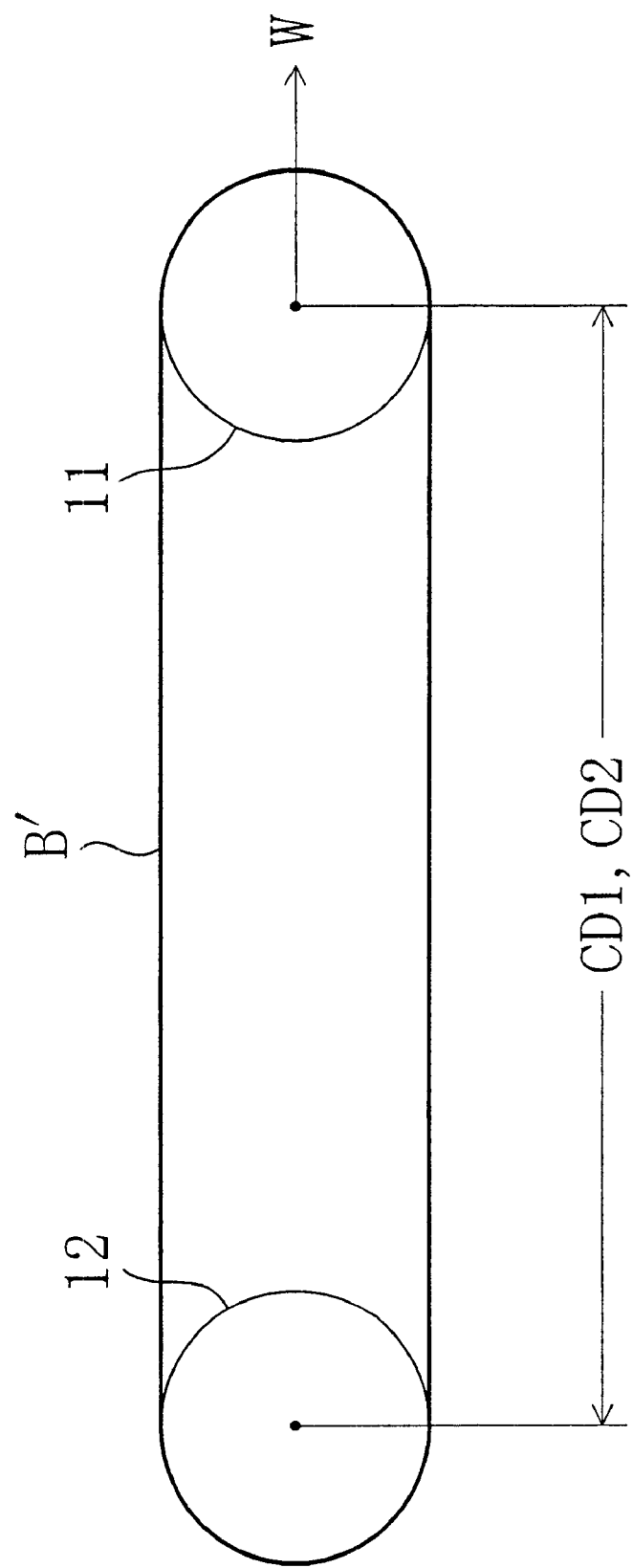

V-RIBBED BELT AND METHOD FOR FABRICATING THE SAME

CROSS REFERENCE TO RELATED APPLICATION

This is a divisional application of application Ser. No. 09/511,355, filed Feb. 23, 2000, currently pending.

BACKGROUND OF THE INVENTION

1. Field of the Invention

This invention relates to a V-ribbed belt having bottom and back faces each provided with the same number of ribs and relates to a method for fabricating the V-ribbed belt.

2. Description of the Prior Art

As an example of V-ribbed belts of this type, there is conventionally known one in which the bottom and back faces of the belt each have the same number of ribs of approximately trapezoidal section formed in corresponding positional relation between the bottom and back faces, for example, as disclosed in U.S. Pat. Nos. 5,273,496, 5,334,107 and 5,507,699.

More specifically, if the top of each rib has an arcuate section, right and left side faces of each rib will act as contact portions in contact under pressure with side faces of a pulley groove of a V-ribbed pulley to contribute to power transmission. In this case, however, the top of each rib not in contact with any surface of the pulley groove forms an unnecessary portion not required for power transmission, and the unnecessary portion induces a problem that it causes cracks due to bending of the belt. Therefore, in the above conventional example, the unnecessary portion at the rib top is eliminated by forming the rib into an approximate trapezoidal section.

Meanwhile, this double-sided V-ribbed belt may be used in a normal position in which the bottom face of the belt is used as an inner peripheral side thereof, and may alternatively be used in a reversed manner that the belt is turned inside out such that the original back face thereof is used as an inner peripheral side.

In such a reversed position of the belt, if the cord is not positioned at the substantially middle portion of the belt along the belt thickness, the relative position of the cord to the pulley when the belt is wound around the pulley will be changed between the normal position (see FIG. 5a) and the reversed position (see FIG. 5b). This increases a difference between an effective pulley diameter when the bottom-face-side ribs of the V-ribbed belt are faced on the inner peripheral side thereof and an effective pulley diameter when the back-face-side ribs thereof are faced on the inner peripheral side thereof, resulting in an increased departure of a speed ratio of revolution transmitted between the pulleys of the effective pulley diameters from that of revolution transmitted between pulleys of design diameters. In addition, the belt length will also be changed between the bottom and back faces. This needs for a large movement allowance of the pulley movable for tensioning the belt and therefore makes it difficult to provide a compact design of a belt power transmission device.

Particularly for a belt in which the bottom-face-side and back-face-side ribs are arranged at equal pitches so as to be used arbitrarily in either of its normal and reversed positions, an influence derived from the departure from the speed ratio as designed becomes a serious problem. It causes, for example, lack of capacity of an engine auxiliary (a decreased amount of power generation or a decreased hydraulic pressure), deterioration in shaft life due to abnormal increases in rotational speed, and so on.

Therefore, the present invention has its object of suppressing a discrepancy between respective speed ratios of revolution transmitted from one pulley to the other in the normal and reversed positions of a V-ribbed belt having ribs of approximately trapezoidal section as described above on both the bottom and back faces by appropriately positioning a cord of the belt.

SUMMARY OF THE INVENTION

To attain the above object, the present invention provides for positioning the center of the cord substantially in the middle of the belt thickness.

More specifically, the present invention is directed to a V-ribbed belt in which a cord is embedded generally in a helical arrangement to form a row along the belt width and a plurality of ribs of approximately trapezoidal section are formed on each of bottom and back faces of the belt and in corresponding positional relation between the bottom and back faces to extend in parallel with each other along the belt length.

In the belt, the ribs in both the bottom and back faces are made of rubber of identical characteristic and formed in approximately identical size and shape, and the cord is disposed substantially in the middle of the belt thickness.

With this arrangement, since the cord is disposed substantially in the middle of the belt thickness, the relative position of the cord to a pulley when the belt is wound around the pulley in each of the normal and reversed positions is identical. This suppresses a discrepancy between the speed ratios of one pulley to the other in both the positions of the belt.

A difference between a belt length when the ribs in the bottom face of the belt are faced on an inner peripheral side thereof and a belt length when the ribs in the back face thereof are faced on the inner peripheral side thereof is preferably 2 mm or less. With this arrangement, there can be obtained a desirable range of positions of the cord to be disposed substantially in the middle of the belt thickness. In other words, if the difference between both the belt lengths is over 2 mm, an effect of suppressing a discrepancy in speed ratio between the normal and reversed positions of the belt is insufficient. Therefore, the difference between both the belt lengths is set at 2 mm or less.

A difference between a distance from the center of the cord to a top end of each of the ribs in the bottom face and a distance from the center of the cord to a top end of each of the corresponding ribs in the back face may be 0.3 mm or less on the average over the entire circumference of the belt. Also in this case, there can be obtained a desirable range of positions of the cord to be disposed substantially in the middle of the belt thickness. In other words, if the difference between both the distances is over 0.3 mm on the average over the entire circumference of the belt, the effect of suppressing the discrepancy in speed ratio between the normal and reversed positions of the belt is insufficient. Therefore, the difference between both the distances is set at 0.3 mm or less.

A top of the rib may include a planar top surface along the belt width and a pair of right and left corners with one end continuing to a left or right end of the top surface and the other end continuing to a side face of the rib, both the corners may be formed in respective arcuate sections having different centers of curvature positioned bilaterally with respect to the centerline of the rib, and when the height of the rib is hr and the curvature radius of the corner of the rib is R, the curvature radius R may be set to meet the following formula: $0.17hr \leq R < 0.5hr$.

Alternatively, a top of the rib may include a planar top surface along the belt width and a pair of right and left corners with one end continuing to a left or right end of the top surface and the other end continuing to a side face of the rib, both the corners may be formed in respective arcuate sections having different centers of curvature positioned bilaterally with respect to the centerline of the rib, and when the pitch of the ribs is p and the curvature radius of the corner of the rib is R, the curvature radius R maybe set to meet the following formula: $0.14p \leq R < 0.35p$.

With these arrangements, only the right and left corners of each rib of the belt located on both sides of the planar top surface of the rib are formed in respective arcuate sections having different centers of curvature positioned bilaterally with respect to the centerline of the rib, and the curvature radius R of the corner falls into the range of $0.17hr \leq R < 0.5hr$ or the range of $0.14p \leq R < 0.35p$. Accordingly, when the belt is in a bent position, it can be effectively prevented that stress is concentrated to the corners of each rib located in the outer periphery of the belt. This improves crack-proof performance of the belt in its bent position and keeps it constant, thereby extending the belt life. In addition, large areas of the rib side faces can be kept into contact with the pulley groove when the belt is fitted into the pulley groove. This ensures an improved power transmission performance of the belt.

If the curvature radius R of the rib corner is less than 0.17hr or less than 0.14p, the crack-proof performance of the belt will be insufficient. On the other hand, if the curvature radius R of the rib corner is not less than 0.5hr or not less than 0.35p, not only the crack-proof performance of the belt will be insufficient but also the rate of slip thereof will be increased because the length of the contact portion of the rib in contact under pressure with the pulley groove surface to contribute to power transmission is decreased. Therefore, when the curvature radius R of the rib corner is set to fall into the range of $0.17hr \leq R \leq 0.5hr$ or the range of $0.14p \leq R < 0.35p$, the belt can improve its crack-proof performance at the rib corner located at the top of the rib while improving its power transmission performance by increasing the area of the contact portion of the rib contributing to power transmission.

Furthermore, the present invention is directed to a method for fabricating a V-ribbed belt in which a cord is embedded generally in a helical arrangement to form a row along the belt width and a plurality of ribs of approximately trapezoidal section are formed on each of bottom and back faces of the belt and in corresponding positional relation between the bottom and back faces to extend in parallel with each other along the belt length. This method includes the steps of grinding a bottom face of a flat belt including a cord embedded therein generally in a helical arrangement to form a row along the belt width until a thickness d1 of the belt after ground satisfies the following formula:

$$d1 = hr + \delta c + C/2 + H/2 + (L1 - L2)/(2\pi) \qquad (1)$$

where hr is a set height of the rib, $\delta c$ is a set thickness from an end of the cord adjacent the rib to a bottom of the rib, C is the diameter of the cord, H is a set thickness of the V-ribbed belt, L1 is a bottom-face-side inner length of the belt when the bottom face of the belt is faced on an inner peripheral side thereof, and L2 is a back-face-side inner length of the belt when the back face of the belt is faced on the inner peripheral side thereof, and grinding a back face of the ground flat belt until a thickness d2 of the belt after ground satisfies the following formula:

$$d2 = (hr + \delta c + C/2) \times 2 \qquad (2)$$

According to this method, when the V-ribbed belt is fabricated by grinding both faces of the flat belt to form ribs therein, both the faces of the flat belt can be ground such that the cord is positioned substantially in the middle of the thickness of the V-ribbed belt even if the position of the cord embedded in the flat belt is unknown. Accordingly, a V-ribbed belt having a cord positioned substantially in the middle of the belt thickness can be readily obtained.

In the above case, in obtaining the bottom-face-side inner length L1 and the back-face-side inner length L2 of the belt, the bottom-face-side inner length L1 of the belt is preferably obtained with the flat belt yet to be ground wound at the bottom face thereof between measuring pulleys formed of a pair of flat pulleys having equal diameters according to the following formula:

$$L1 = (2 \times CD1 + K\pi)/\alpha \qquad (3)$$

where CD1 is the center distance between the measuring pulleys, K is the outer diameter of the measuring pulley, and $\alpha$ is the coefficient of extension of the flat belt under a load of the measuring pulley, and then the back-face-side inner length L2 of the belt is preferably obtained with the flat belt wound at the back face thereof between the measuring pulleys according to the following formula:

$$L2 = (2 \times CD2 + K\pi)/\alpha \qquad (4)$$

where CD2 is the center distance between the measuring pulleys.

Thus, by measuring the center distances CD1 and CD2 between the measuring pulleys, the bottom-face-side and back-face-side inner lengths L1 and L2 of the belt can be readily obtained.

BRIEF DESCRIPTION OF THE DRAWINGS

FIG. 3 is an illustrative diagram showing a yet-to-be-machined flat belt in a state wound between measuring pulleys to measure the center distance.

DESCRIPTION OF THE PREFERRED EMBODIMENT

Figure 1:
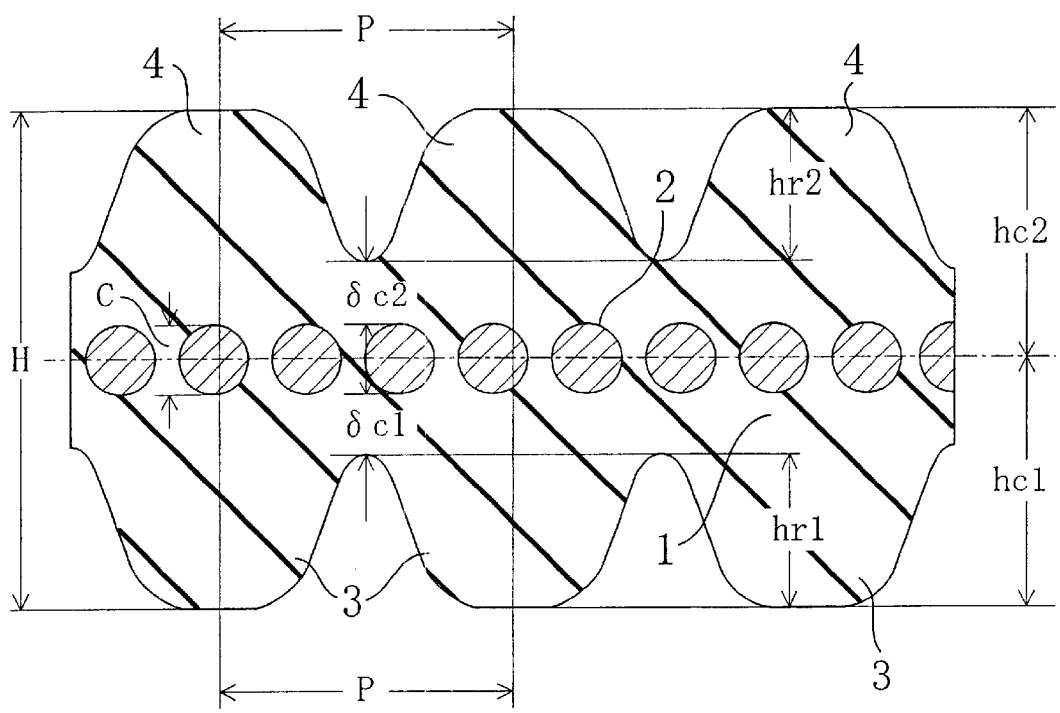
FIG. 1 is a cross-sectional view of a V-ribbed belt according to an embodiment of the present invention.

FIG. 1 shows a V-ribbed belt B according to an embodiment of the present invention. This belt B is formed of a double-sided V-ribbed belt with a thickness of H. In the figure, a reference numeral 1 denotes an endless belt base made of rubber. In the belt base 1, a cord 2 with a diameter of C is embedded generally in a helical arrangement to form a row along the belt width (in a lateral direction of FIG. 1).

On the bottom face of the belt base 1, a plurality of, for example, three bottom-face-side ribs 3, 3, . . . of approximately trapezoidal section and with a height of hr1 are formed to extend in parallel with each other along the belt length and at regular pitches p along the belt width. On the other hand, on the back face of the belt base 1, back-face-side ribs 4, 4, . . . , which is of approximately trapezoidal section, with a height of hr2 and identical in number with the bottom-face-side ribs 3, 3, . . . , are formed at the same pitches p along the belt width as in the bottom-face-side ribs 3, 3, . . . to correspond to them in a vertical relationship.

The bottom-face-side ribs 3, 3, . . . and the back-face-side ribs 4, 4 . . . are made of rubber having identical characteristics (for example, abrasion resistance and heat resistance) and formed substantially in the same size. The cord 2 is disposed substantially in the middle of the belt thickness.

More specifically, a difference between a belt length when the bottom-face-side ribs 3, 3, . . . are faced on an inner peripheral side of the belt (see FIG. 5a) and a belt length when the back-face-side ribs 4, 4, . . . are faced on the inner peripheral side of the belt (see FIG. 5b) is set at 2 mm or less. Further, a difference |hc1−hc2| between a distance hc1 from the center of the cord 2 to the top end of each of the bottom-face-side ribs 3, 3, . . . and a distance hc2 from the center of the cord 2 to the top end of each of the corresponding back-face-side ribs 4, 4, . . . is set at 0.3 mm or less on the average over the entire circumference of the belt.

Figure 2:
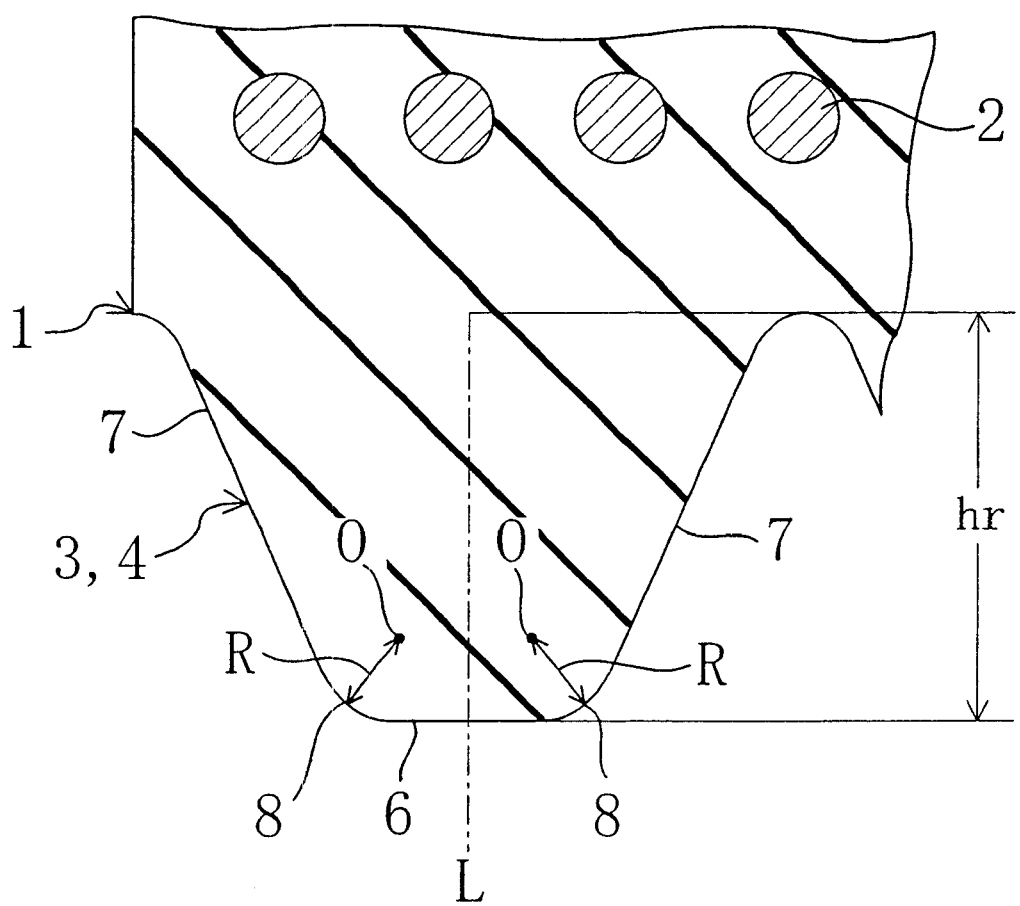
FIG. 2 is an enlarged cross-sectional view of a rib.

Furthermore, as illustrated in detail and enlarged dimension in FIG. 2, the top of each of the bottom-face-side ribs 3, 3, . . . and the back-face-side ribs 4, 4, . . . includes a planar top surface 6 along the belt width (the direction of arrangement of the cord 2) and a pair of right and left corners 8, 8 with one end continuing to a left or right end of the top surface 6 and the other end continuing to a rib side face 7. Both the corners 8, 8 are formed in respective arcuate sections having two different centers O, O of curvature positioned bilaterally with respect to the vertical centerline L of the ribs 3, 4.

In addition, both the corners 8, 8 have equal curvature radii R, R. And, when the height of the rib 3, 4 is hr (=hr1 or hr2), the curvature radius R is set to fall into the range of $0.17hr \leq R < 0.5hr$ or the range of $0.14p \leq R < 0.35p$.

Next, a method for fabricating the V-ribbed belt B will be described. As shown in FIG. 3, a flat belt B' including the cord 2 embedded therein generally in a helical arrangement to form a row along the belt width is prepared, and the flat belt B' is wound between a pair of measuring pulleys 11, 12 each formed of a flat pulley with an outer diameter of K so as to provide contact at the bottom face of the belt B' with the measuring pulleys 11, 12. In this state, a measuring load W is applied to one of the measuring pulleys, for example, the right-hand one 11 in FIG. 3, in a direction away from the other measuring pulley 12, and a center distance CD1 between both the measuring pulleys 11, 12 is measured. Based on the center distance CD1, a bottom-face-side inner length L1 of the belt when the bottom face of the V-ribbed belt B is faced on the inner peripheral side thereof is found by $L1=(2 \times CD1+K\pi)/\alpha$ (see the above-described formula ③), wherein α is the coefficient of extension of the flat belt B' under the measuring load W.

Subsequently, the flat belt B' is turned inside out to change the back face thereof to the inner peripheral side (the bottom face to the outer peripheral side), and in this reversed state the flat belt B' is wound between the same measuring pulleys 11, 12 so as to provide contact at the back face thereof with the measuring pulleys 11, 12. And, in the same manner as described above, a center distance CD2 between the measuring pulleys 11, 12 is measured with a measuring load W applied to the measuring pulley 11. Then, based on the measured center distance CD2, the back-face-side inner length L2 of the belt when the back face of the V-ribbed belt B is faced on the inner peripheral side is found by $L2=(2 \times CD2+K\pi)/\alpha$ (see the above-described formula ④).

Figure 4A:
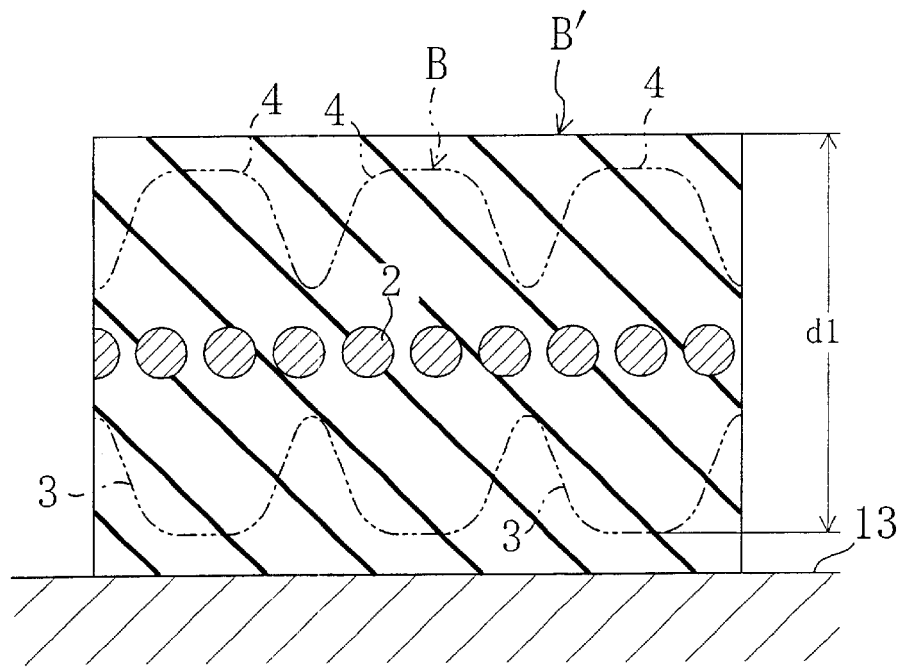
FIGS. 4a and 4b show cross-sectional views for illustrating the thicknesses of the flat belt after ground.

Thereafter, as shown in FIG. 4a, the bottom face of the flat belt B' now oriented on the outer peripheral side is ground by a grinding stone 13 as it is put into the reversed state. The grinding work is performed until a thickness d1 of the belt after ground reaches $hr+\delta c+C/2+H/2+(L1-L2)/(2\pi)$ (see the above-described formula ①), namely, if the center distances CD1 and CD2 are used, $hr+\delta c+C/2+H/2+(CD1-CD2)/(\pi\alpha)$, wherein δc is a set thickness from an end of the cord 2 adjacent the rib 3, 4 to the bottom of the rib 3, 4.

Figure 4B:
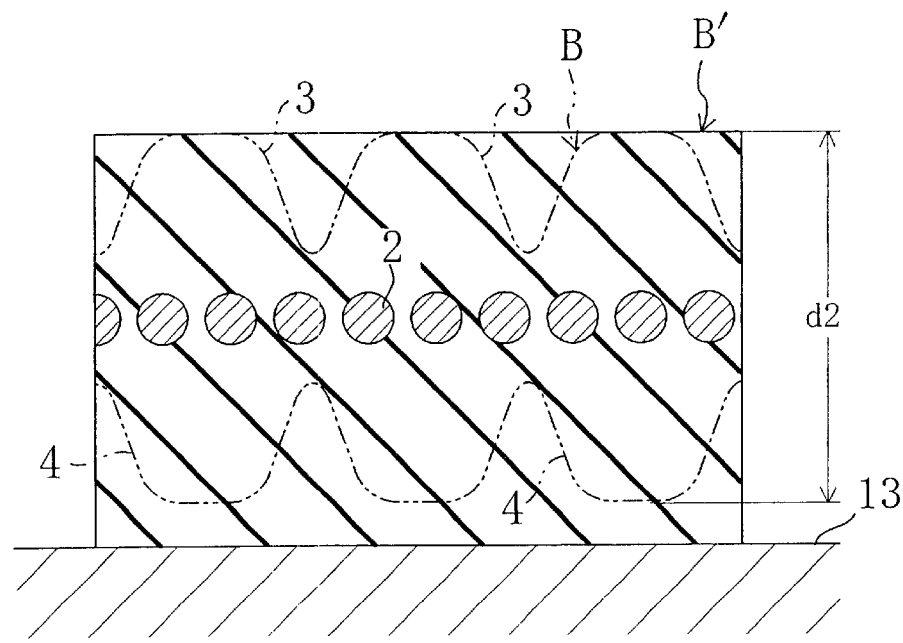

Subsequently, as shown in FIG. 4b, the ground flat belt B' is turned from the reversed state back to the original state, and the back face thereof oriented on the outer peripheral side is ground by the grinding stone 13 in the same manner. The grinding work is performed until a thickness d2 of the belt after ground reaches $(hr+\delta c+C/2) \times 2$ (see the above-described formula ②).

As described above, in the present embodiment, the difference between the bottom-face-side belt length when the bottom-face-side ribs 3, 3, . . . of the V-ribbed belt B are faced on the inner peripheral side of the belt and the back-face-side belt length when the back-face-side ribs 4, 4, . . . thereof are faced on the inner peripheral side thereof is set at 2 mm or less. Further, the difference |hc1−hc2| between the distance hc1 from the center of the cord 2 to the top end of each of the bottom-face-side ribs 3, 3, . . . and the distance hc2 from the center of the cord 2 to the top end of each of the corresponding back-face-side ribs 4, 4, . . . is set at 0.3 mm or less on the average over the entire circumference of the belt B. For these reasons, the center of the cord 2 can be positioned substantially in the middle of the belt thickness. Accordingly, the position of the cord 2 in the normal position and that in the reversed position of the belt are identical in the state that the belt B is wound between the V-ribbed pulleys. As a result, a difference between an effective pulley diameter DC1 when the bottom-face-side ribs 3 of the V-ribbed belt B are faced on the inner peripheral side thereof and an effective pulley diameter DC2 when the back-face-side ribs 4 of the belt are faced on the inner peripheral side thereof is small. This suppresses a departure of the speed ratio between the pulleys of the effective diameters in each of the positions of the belt from the speed ratio between pulleys of design diameter D.

Furthermore, only the right and left corners 8, 8 located on both sides of the planar top surface 6 of each of the ribs 3, 4 of the belt B are formed in respective arcuate sections having different centers O, O of curvature positioned bilaterally with respect to the centerline of the ribs 3, 4, and the curvature radius R of each of the corners 8, 8 is set within the range of $0.17hr \leq R < 0.5hr$ or the range of $0.14p \leq R < 0.35p$. Accordingly, when the belt B is in a bent position, it can be effectively prevented that stress is concentrated to the corners 8, 8 of each rib 3 or 4 located in the outer periphery of the belt. This improves crack-proof performance of the belt B in its bent position and keeps it constant, thereby extending the lifetime of the belt B. In addition, large areas of the rib side faces 7, 7 can be kept into contact with the pulley groove when the belt is fitted into the pulley groove. This ensures an improved power transmission performance of the belt B.

Moreover, when the V-ribbed belt B is fabricated by grinding the flat belt B', the bottom face of the flat belt B' is first ground until the thickness d1 of the belt after ground reaches hr+δc+C/2+H/2+(L1−L2)/(2π) and the back face of the ground flat belt B' is then ground until the thickness d2 of the belt after ground reaches (hr+δc+C/2)×2. Therefore, both the bottom and back faces of the flat belt B' can be ground such that the cord 2 is positioned substantially in the middle of the thickness of the V-ribbed belt B even if the position of the cord 2 embedded in a flat belt B' is unknown. Accordingly, a V-ribbed belt B having a cord 2 positioned substantially in the middle of the belt thickness can be readily obtained.

In this case, the bottom-face-side inner length L1 of the belt is obtained with the flat belt B' yet to be ground wound between the pair of measuring pulleys 11, 12 having equal diameters so as to provide contact at the bottom face thereof with the measuring pulleys 11, 12, and the back-face-side inner length L2 of the belt is obtained with the flat belt B' wound between the measuring pulleys 11, 12 so as to provide contact at the back face thereof with the measuring pulleys 11, 12. Accordingly, these inner lengths L1 and L2 of the belt can be readily obtained.

Next, examples practically made will be described.
(Examination 1)

Figure 5A:
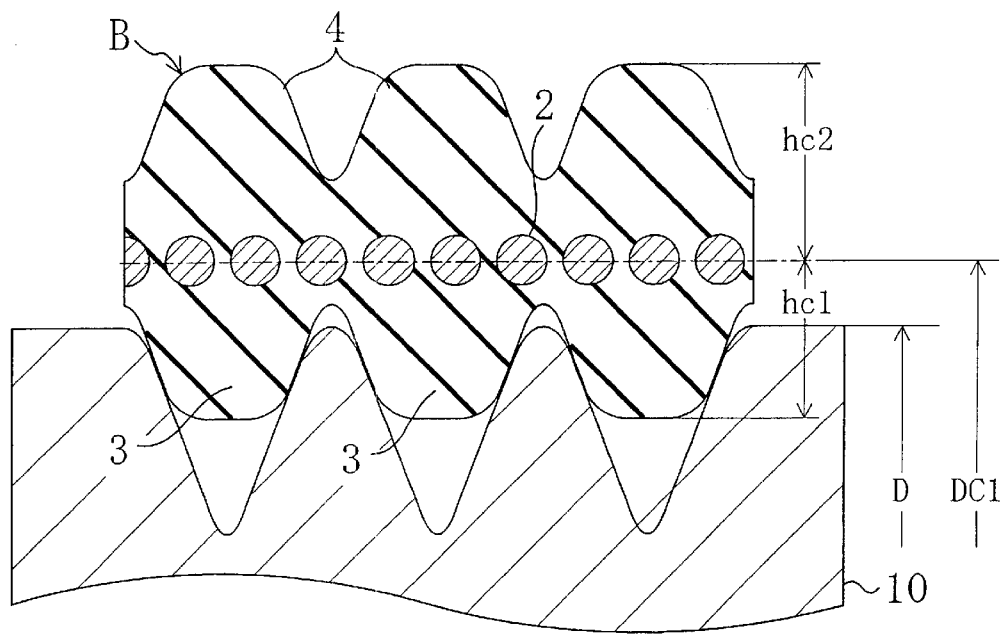
FIGS. 5a and 5b show cross-sectional views of a V-ribbed belt in which the distance between a cord center and a bottom-face-side rib top is different from the distance between the cord center and a back-face-side rib top, the V-ribbed belt being wound around a pulley in normal and reversed positions.
Figure 5B:
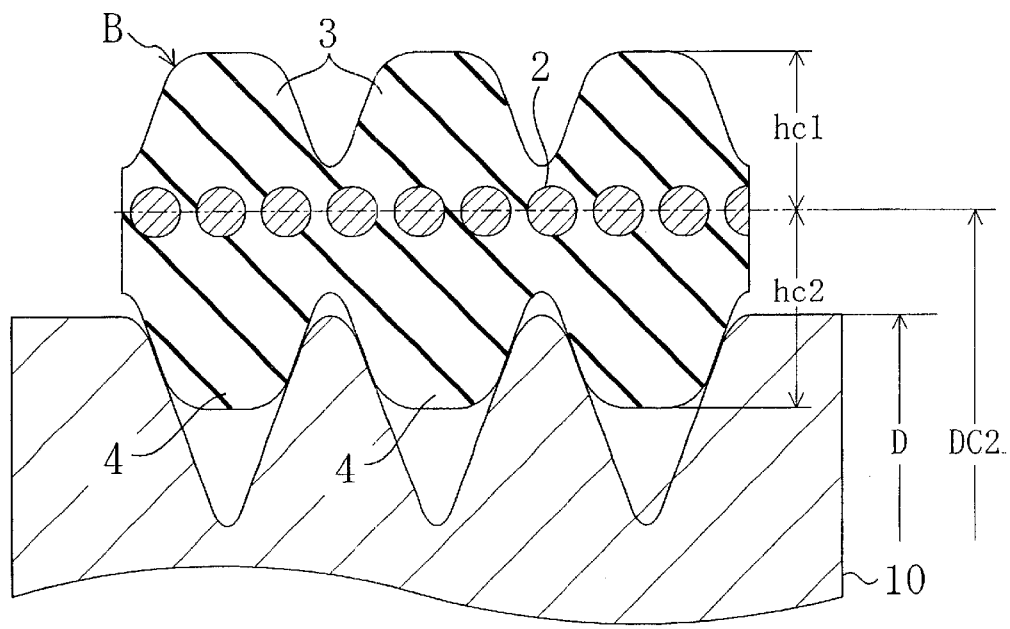

For the V-ribbed belt having the structure of the above embodiment, various belt examples was fabricated in such a manner that the distance hc1 from the center of the cord to the top end of the bottom-face-side rib and the distance hc2 from the center of the cord to the top end of the back-face-side rib were changed respectively. Each of the distances hc1 and hc2 is an average over the entire circumference of the belt. Then, on an X-Y two-dimensional coordinate basis, V-ribbed pulleys with an outer diameter of 120 mm were disposed at positions represented by coordinates (0, 0) and (0, 300), respectively, a V-ribbed pulley with an outer diameter of 55 mm was disposed at a position represented by a coordinate (200, 150), and a V-ribbed pulley with an outer diameter of 75 mm was disposed at a position represented by a coordinate (50, 150) (wherein the unit of each coordinate is mm). Each of the belt examples described above was wound around these pulleys in each of the normal and reversed positions, and a difference between lengths (at the cord position) of the belt example wound respectively in both the positions was measured. FIGS. 5a and 5b show the states of the belt wound around a pulley in normal and reversed positions, respectively. It is to be noted that like parts as in FIG. 1 will be described using like reference numerals. The examination results are shown in Table 1 and FIG. 6.

TABLE 1

| hc1 | hc2 | Difference in hc | Belt length in normal position | Belt length in reversed position | Difference in belt length |
|---|---|---|---|---|---|
| 2.95 | 3.95 | 1.00 | 1279.22 | 1272.93 | 6.28 |
| 3.05 | 3.85 | 0.80 | 1278.59 | 1273.56 | 5.03 |
| 3.15 | 3.75 | 0.60 | 1277.96 | 1274.19 | 3.77 |
| 3.25 | 3.65 | 0.40 | 1277.33 | 1274.82 | 2.51 |
| 3.35 | 3.55 | 0.20 | 1276.70 | 1275.45 | 1.26 |
| 3.45 | 3.45 | 0.00 | 1276.08 | 1276.08 | 0.00 |

(unit: mm)

Figure 6:
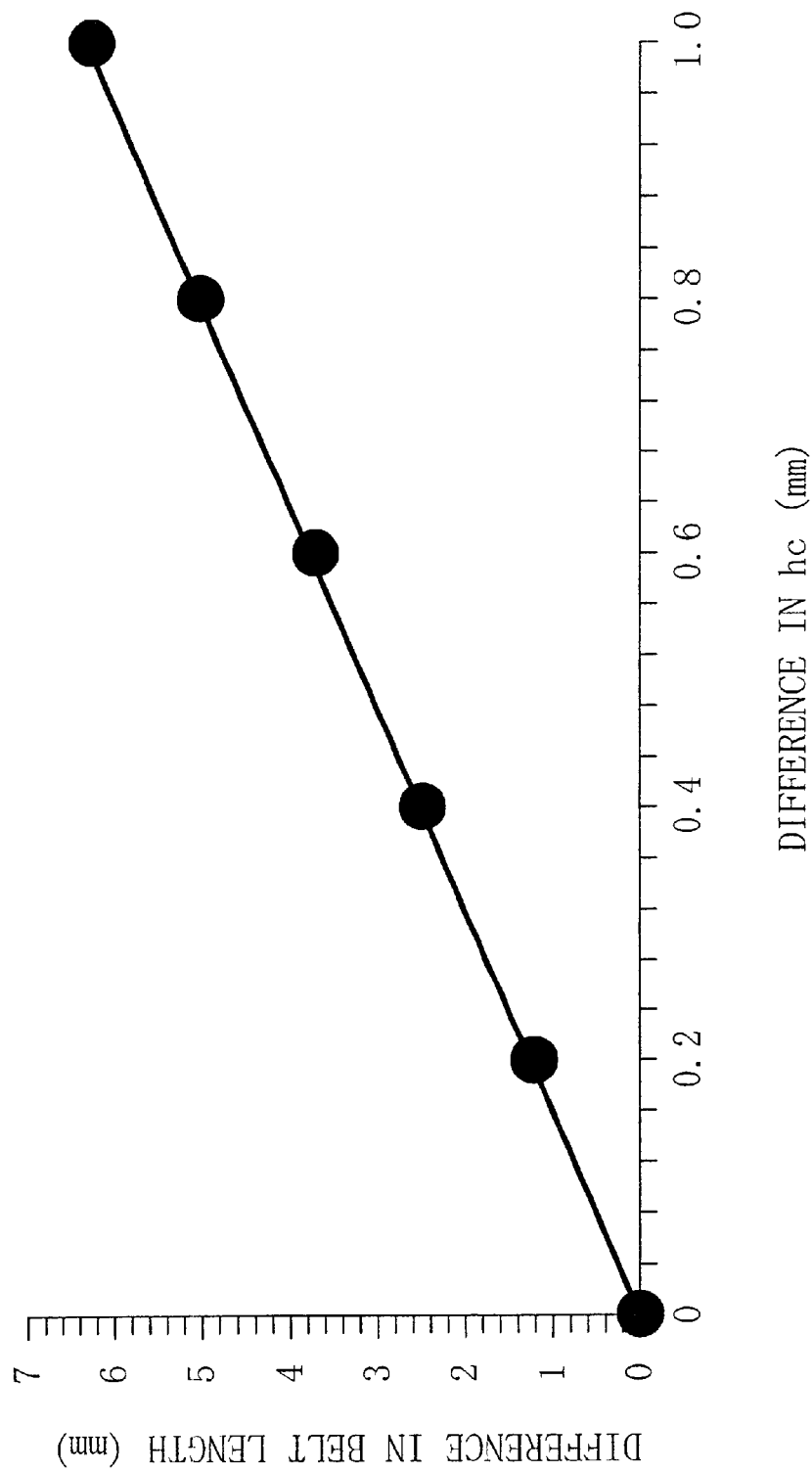
FIG. 6 is a graph showing results of an examination for finding a relationship of the difference in belt length with the difference between the distance from the cord center to a bottom face of the belt and the distance from the cord center to a back face of the belt.

As can be seen from Table 1 and FIG. 6, the difference in belt length between the normal and reversed positions is larger as the difference |hc1−hc2| between the distance hc1 from the center of the cord to the top end of the bottom-face-side rib and the distance hc2 from the center of the cord to the top end of the back-face-side rib is increased. It can be also seen therefrom that the corresponding difference in belt length is approximately 2 mm when the difference |hc1−hc2| is 0.3 mm.

(Examination 2)

Like Examination 1, various belt examples were prepared in a manner that the distance hc1 from the center of the cord to the top end of the bottom-face-side rib and the distance hc2from the center of the cord to the top end of the back-face-side rib were respectively changed. Each of these examples was wound between drive and driven pulleys having equal outer diameters of 100 mm in each of the normal and reversed positions, and the rate of departure of the speed ratio in the reversed position from that in the normal position was determined. The same examination was also executed in the condition that the drive and driven pulleys having equal diameters of 50 mm are used. The results of these examinations are shown in Table 2 and FIG. 7.

TABLE 2

| OD of drive pulley | OD of driven pulley | hc1 | hc2 | Diff. in hc | Normal position | | | Reversed position | | | Rate of Departure of speed ratio (%) (b/a) × 100 |
|---|---|---|---|---|---|---|---|---|---|---|---|
| | | | | | Eff. OD of drive pulley | Eff. OD of driven pulley | Speed ratio a | Eff. OD of drive pulley | Eff. OD of driven pulley | Speed ratio b | |
| 100 | 100 | 2.95 | 3.95 | 1.00 | 101.7 | 103.7 | 0.981 | 103.7 | 101.7 | 1.020 | 104.0 |
| | | 3.00 | 3.90 | 0.90 | 101.8 | 103.6 | 0.983 | 103.6 | 101.8 | 1.018 | 103.6 |
| | | 3.05 | 3.85 | 0.80 | 101.9 | 103.5 | 0.985 | 103.5 | 101.9 | 1.016 | 103.2 |
| | | 3.10 | 3.80 | 0.70 | 102.0 | 103.4 | 0.986 | 103.4 | 102.0 | 1.014 | 102.8 |
| | | 3.15 | 3.75 | 0.60 | 102.1 | 103.3 | 0.988 | 103.3 | 102.1 | 1.012 | 102.4 |
| | | 3.20 | 3.70 | 0.50 | 102.2 | 103.2 | 0.990 | 103.2 | 102.2 | 1.010 | 102.0 |
| | | 3.25 | 3.65 | 0.40 | 102.3 | 103.1 | 0.992 | 103.1 | 102.3 | 1.008 | 101.6 |
| | | 3.30 | 3.60 | 0.30 | 102.4 | 103.0 | 0.994 | 103.0 | 102.4 | 1.006 | 101.2 |

TABLE 2-continued

| OD of drive pulley | OD of driven pulley | hc1 | hc2 | Diff. in hc | Normal position | | Speed ratio a | Reversed position | | Speed ratio b | Rate of Departure of speed ratio (%) (b/a) × 100 |
|---|---|---|---|---|---|---|---|---|---|---|---|
| | | | | | Eff. OD of drive pulley | Eff. OD of driven pulley | | Eff. OD of drive pulley | Eff. OD of driven pulley | | |
| | | 3.35 | 3.55 | 0.20 | 102.5 | 102.9 | 0.996 | 102.9 | 102.5 | 1.004 | 100.8 |
| | | 3.40 | 3.50 | 0.10 | 102.6 | 102.8 | 0.998 | 102.8 | 102.6 | 1.002 | 100.4 |
| | | 3.45 | 3.45 | 0.00 | 102.7 | 102.7 | 1.000 | 102.7 | 102.7 | 1.000 | 100.0 |
| 50 | 50 | 2.95 | 3.95 | 1.00 | 51.7 | 53.7 | 0.963 | 53.7 | 51.7 | 1.039 | 107.9 |
| | | 3.00 | 3.90 | 0.90 | 51.8 | 53.6 | 0.966 | 53.6 | 51.8 | 1.035 | 107.1 |
| | | 3.05 | 3.85 | 0.80 | 51.9 | 53.5 | 0.970 | 53.5 | 51.9 | 1.031 | 106.3 |
| | | 3.10 | 3.80 | 0.70 | 52.0 | 53.4 | 0.974 | 53.4 | 52.0 | 1.027 | 105.5 |
| | | 3.15 | 3.75 | 0.60 | 52.1 | 53.3 | 0.977 | 53.3 | 52.1 | 1.023 | 104.7 |
| | | 3.20 | 3.70 | 0.50 | 52.2 | 53.2 | 0.981 | 53.2 | 52.2 | 1.019 | 103.9 |
| | | 3.25 | 3.65 | 0.40 | 52.3 | 53.1 | 0.985 | 53.1 | 52.3 | 1.015 | 103.1 |
| | | 3.30 | 3.60 | 0.30 | 52.4 | 53.0 | 0.989 | 53.0 | 52.4 | 1.011 | 102.3 |
| | | 3.35 | 3.55 | 0.20 | 52.5 | 52.9 | 0.992 | 52.9 | 52.5 | 1.008 | 101.5 |
| | | 3.40 | 3.50 | 0.10 | 52.6 | 52.8 | 0.996 | 52.8 | 52.6 | 1.004 | 100.8 |
| | | 3.45 | 3.45 | 0.00 | 52.7 | 52.7 | 1.000 | 52.7 | 52.7 | 1.000 | 100.0 |

(unit: mm)

Figure 7:
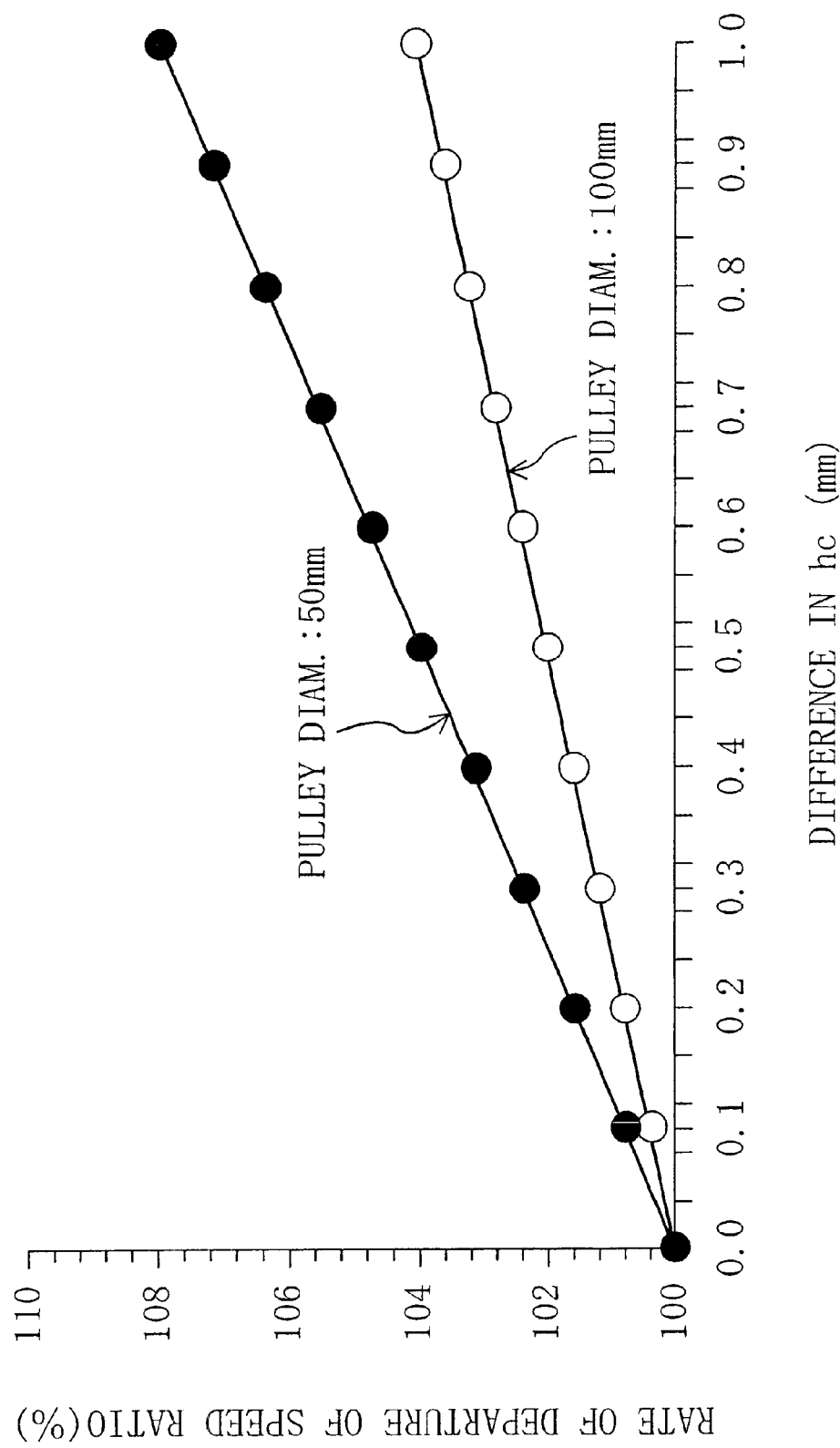
FIG. 7 is a graph showing results of an examination for finding a relationship of the rate of departure of a speed ratio with the difference between the distance from the cord center to the bottom face of the belt and the distance from the cord center to the back face of the belt.

As can be seen from Table 2 and FIG. 7, the discrepancy in speed ratio between the normal and reversed positions is larger as the difference |hc1−hc2| between the distance hc1 from the center of the cord to the top end of the bottom-face-side rib and the distance hc2 from the center of the cord to the top end of the back-face-side rib is increased.

(Examination 3)

Figure 8:
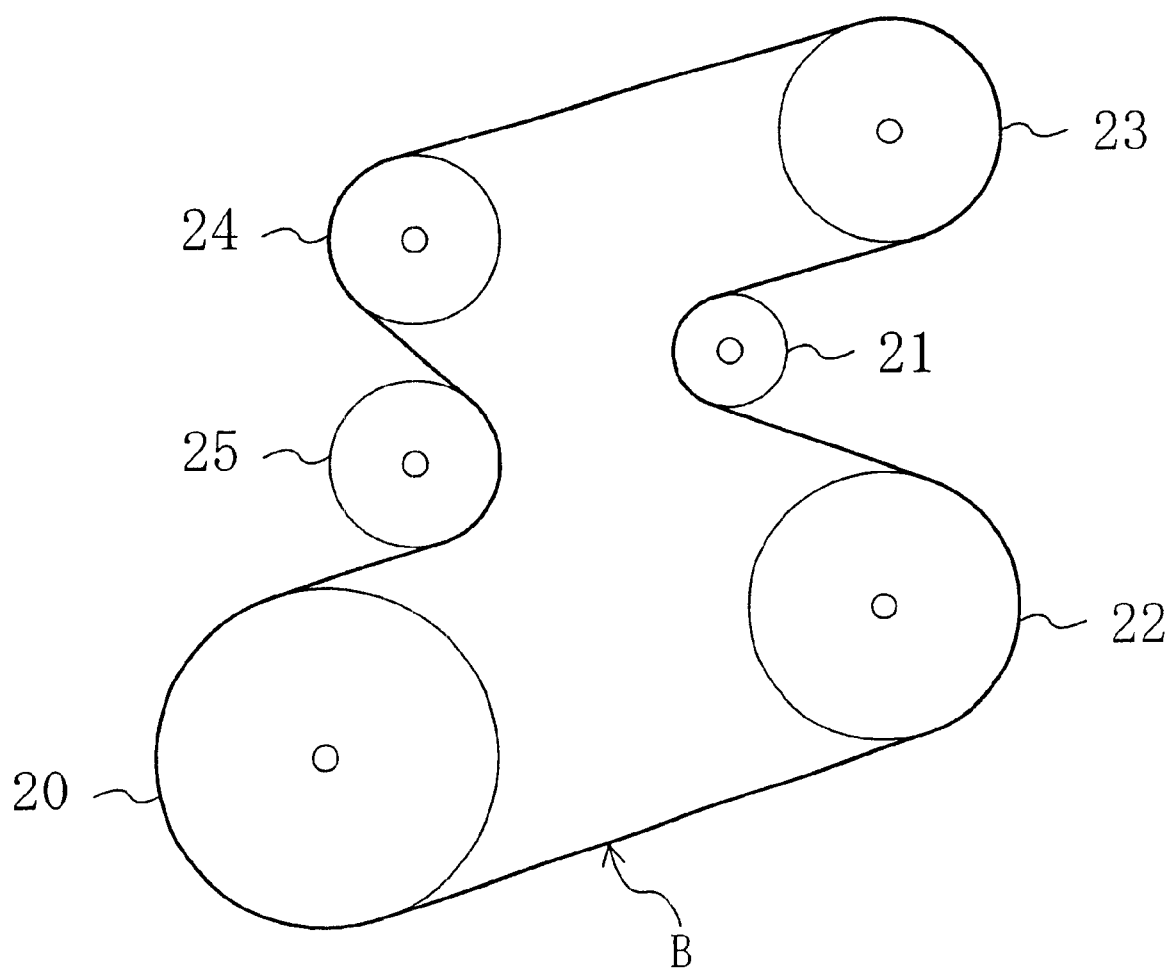
FIG. 8 is an illustrative diagram showing an auxiliary driving device for examining a relationship of the change in the amount of power generated by an alternator with the difference between the distance from the cord center to the bottom face of the belt and the distance from the cord center to the back face of the belt.

Like Examinations 1 and 2, various belt examples were prepared in a manner that the distance hc1 from the center of the cord to the top end of the bottom-face-side rib and the distance hc2 from the center of the cord to the top end of the back-face-side rib were respectively changed. Each of these examples was wound around pulleys of an auxiliary driving device for an engine in each of the normal position (a normally facing belt drive) and reversed position (a reverse facing belt drive), and a change in speed ratio between both the positions and an associated change in amount of power generated by an alternator (not shown) as an auxiliary machine were examined. The results of this examination are shown in Table 3. It is to be noted that as shown in FIG. 8, the auxiliary driving device is disposed so that four idle pulleys 22 through 25 are arranged between a drive pulley 20 with an outer diameter of 150 mm and a driven pulley 21 with an outer diameter of 55 mm with, for example, one pulley 22 forming tight side spans and the other pulleys forming slack side spans. The drive pulley 20 is drivingly connected to a crank shaft of the unshown engine to serve as a crank pulley, while the driven pulley 21 is drivingly connected to the alternator to serve as an alternator pulley. The belt B is wound in "a normally bent state" around the drive pulley 20 and the idle pulleys 22 through 24, while it is wound in "a reverse bent state" around the remaining driven pulley 21 and idle pulley 25.

TABLE 3

| OD of drive pulley | OD of driven pulley | hc1 | hc2 | Diff. in hc | Normally facing belt drive | | | | Reverse facing belt drive | | | | Diff. in amount of generated power (A) |
|---|---|---|---|---|---|---|---|---|---|---|---|---|---|
| | | | | | Eff. drive pulley diam. (mm) | Eff. driven pulley diam. (mm) | Eff. speed ratio | Amount of generated power (A) | Eff. drive pulley diam. (mm) | Eff. driven pulley diam. (mm) | Eff. speed ratio | Amount of generated power (A) | |
| 150 | 55 | 2.85 | 4.05 | −1.20 | 151.6 | 57.8 | 2.62 | 42.0 | 152.8 | 56.6 | 2.70 | 46.5 | 4.5 |
| | | 2.93 | 3.98 | −1.05 | 151.7 | 57.7 | 2.63 | 43.0 | 152.7 | 56.7 | 2.69 | 46.0 | 3.0 |
| | | 3.00 | 3.90 | −0.90 | 151.8 | 57.7 | 2.63 | 43.5 | 152.7 | 56.8 | 2.69 | 46.0 | 2.5 |
| | | 3.08 | 3.83 | −0.75 | 151.8 | 57.6 | 2.64 | 44.5 | 152.6 | 56.8 | 2.68 | 45.5 | 1.0 |
| | | 3.15 | 3.75 | −0.60 | 151.9 | 57.5 | 2.64 | 44.5 | 152.5 | 56.9 | 2.68 | 45.5 | 1.0 |
| | | 3.23 | 3.68 | −0.45 | 152.0 | 57.4 | 2.65 | 44.5 | 152.4 | 57.0 | 2.68 | 45.5 | 1.0 |
| | | 3.30 | 3.60 | −0.30 | 152.1 | 57.4 | 2.65 | 45.0 | 152.4 | 57.1 | 2.67 | 45.5 | 0.5 |
| | | 3.38 | 3.53 | −0.15 | 152.1 | 57.3 | 2.66 | 45.0 | 152.3 | 57.1 | 2.67 | 45.0 | 0.0 |
| | | 3.45 | 3.45 | 0.00 | 152.2 | 57.2 | 2.66 | 45.0 | 152.2 | 57.2 | 2.66 | 45.0 | 0.0 |

As can be seen from Table 3, when the difference |hc1−hc2| between the distance hc1 from the center of the cord to the top end of the bottom-face-side rib and the distance hc2 from the center of the cord to the top end of the back-face-side rib is 0.3 mm or less, the amount of power generated by the alternator can be held at 45 amperes or more with stability even if the belt B is run in the normal position (the normally facing belt drive) or in the reverse position (the reverse facing belt drive), and therefore a difference of 0.3 mm or less between the distances hc1 and hc2 provides a suitable range for positioning the cord substantially in the middle of the belt thickness.

(Examination 4)

As a practical example of the present invention, a sample V-ribbed belt was prepared in which the rib top thereof was formed of a planar top face and a pair of right and left corners located on both sides of the top face as described in the above embodiment. In this belt, the number of bottom-face-side ribs 3 was three, the number of back-face-side ribs 4 was three and the pitch p of the ribs 3, 4 on each side was 3.56 mm. Further, the height hr (hr1 or hr2) of each rib 3, 4 was 2.5 mm, the angle of each rib 3, 4 was 40 degrees, the belt length was 900 mm and the belt thickness H was 4.8 mm.

Then, the above V-ribbed belt sample of the present invention was wound between a pair of 120 mm diameter V-ribbed-pulleys arranged vertically, and was put into "a reverse bent state" with the slack-side back face thereof pushed by a 60 mm diameter tension pulley. In this state, the belt was left to stand in a low-temperature atmosphere of −35° C. for 24 hours with a load of 298 N applied to the lower V-ribbed pulley downwardly (in a direction to increase the belt tension). Next, by setting one cycle to a period of time during which the upper pulley is driven into rotation at 2000 rpm for 5 minutes and is then held into a stop for 25 minutes, the number of cycles taken for the belt to produce a crack in the rib was measured.

Figure 9:
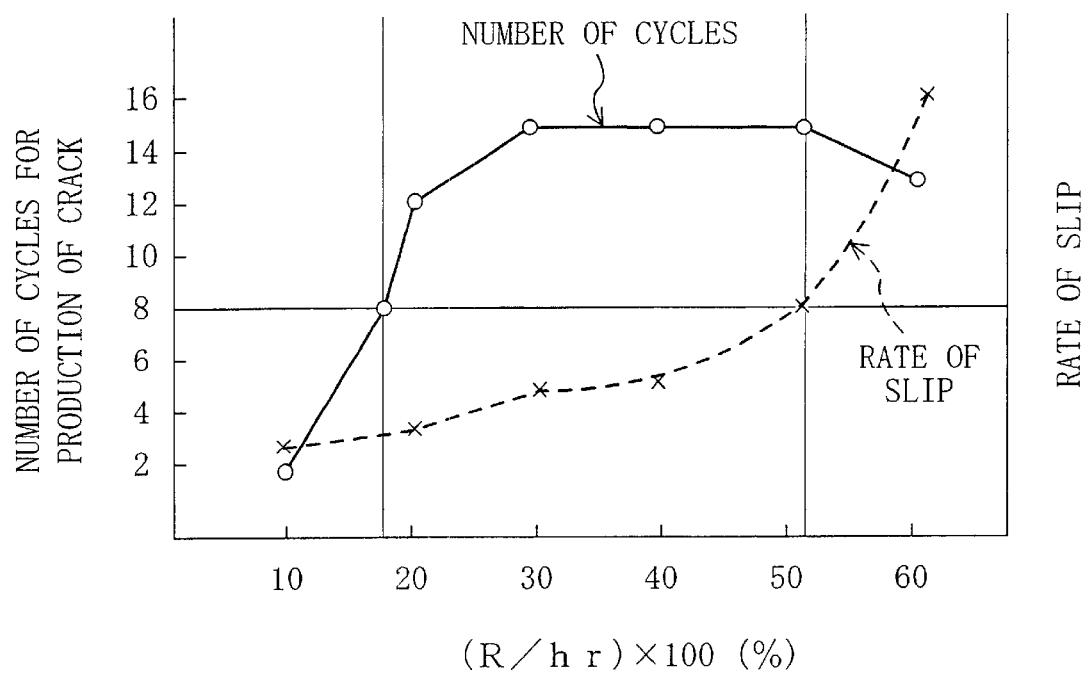
FIG. 9 is a graph showing results of examinations for finding respective relationships of the number of cycles taken for the belt to produce a crack and the rate of slip of the belt with respect to the curvature radius of a corner of the rib.

This examination was repeated under the above conditions while changing the ratio of the curvature radius R of the corner at the rib top to the rib height hr, thereby obtaining results shown in FIG. 9. Further, the rates of slip of the belt in these conditions are also shown in a broken line in FIG. 9. As can be seen from FIG. 9, when the ratio of the curvature radius R of the corner to the rib height hr satisfies $0.17hr \leq R < 0.5hr$, the number of cycles taken for the belt to produce a crack is maximum, i.e., the time lapsed for the occurrence of a crack is extended. At the same time, the rate of slip is 2% or less which approximates a reference value. Accordingly, a belt slip is difficult to occur and improved power transmission performance of the belt can be ensured.

Figure 10:
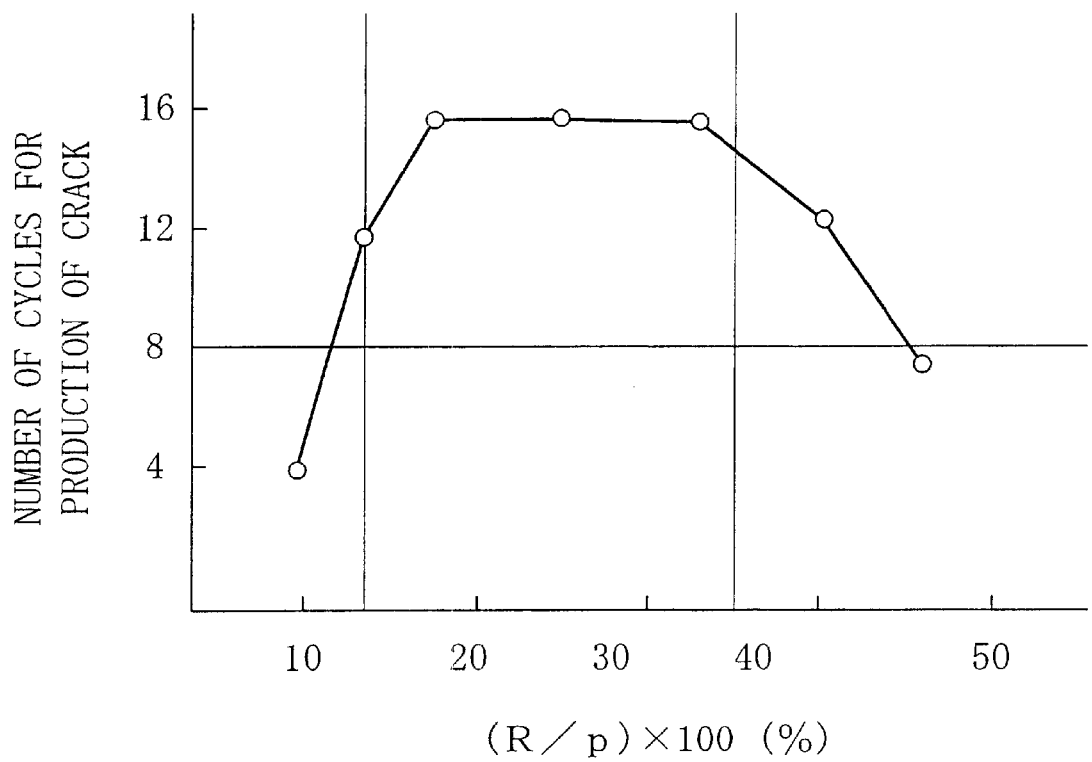
FIG. 10 is a graph showing results of another examination for finding the relationship of the number of cycles taken for the belt to produce a crack with respect to the curvature radius of the corner of the rib.

Furthermore, the above examination was repeated under the same conditions while changing the ratio of the curvature radius R of the corner at the rib top to the rib pitch p, thereby obtaining results shown in FIG. 10. It can be found by the results that when the ratio of the curvature radius R of the corner to the rib pitch p satisfies $0.14p \leq R < 0.35p$, the number of cycles taken for the belt to produce a crack is maximum, i.e., the time lapsed for the occurrence of a crack is extended, which improves crack-proof performance.

As can be understood from the above, when $0.17hr \leq R < 0.5hr$ or $0.14p \leq R < 0.35p$ is satisfied, improvement in crack-proof performance of the rib in "the reverse bent state" of the belt and improvement in power transmission performance of the belt resulting from ensuring a large working flank of the rib can be achieved together.

What is claimed is:

1. A method for fabricating a V-ribbed belt having a width, a bottom face and a back face in which a cord is embedded generally in a helical arrangement to form a row along the belt width and a plurality of ribs of approximately trapezoidal section are formed on each of the bottom and back faces of the belt and in corresponding positional relation between the bottom and back faces to extend in parallel with each other along the belt length, the method comprising the steps of grinding a bottom face of a flat belt including a cord embedded therein generally in a helical arrangement to form a row along the belt width until a thickness d1 of the belt after ground satisfies the following formula:

$$d1 = hr + \delta c + C/2 + H/2 + (L1 - L2)/(2\pi)$$

where hr is a set height of the rib from a bottom of the rib to a top of the rib, $\delta c$ is a set thickness from an end of the cord adjacent to the rib to a bottom of the rib, C is the diameter of the cord, H is a set thickness of the V-ribbed belt, L1 is a bottom-face-side inner length of the belt when the bottom face of the belt is faced on an inner peripheral side thereof, and L2 is a back-face-side inner length of the belt when the back face of the belt is faced on the inner peripheral side thereof, and grinding a back face of the ground flat belt until a thickness d2 of the belt after ground satisfies the following formula:

$$d2 = (hr + \delta c + C/2) \times 2.$$

2. The method for fabricating a V-ribbed belt of claim 1, wherein in obtaining the bottom-face-side inner length L1 and the back-face-side inner length L2 of the belt, the bottom-face-side inner length L1 of the belt is obtained with the flat belt yet to be ground wound at the bottom face thereof between measuring pulleys formed of a pair of flat pulleys having equal diameters according to the following formula:

$$L1 = (2 \times CD1 + K\pi)/\alpha$$

where CD1 is the center distance between the measuring pulleys, K is the outer diameter of the measuring pulley, and $\alpha$ is the coefficient of extension of the flat belt under a load of the measuring pulley, and the back-face-side inner length L2 of the belt is then obtained with the flat belt wound at the back face thereof between the measuring pulleys according to the following formula:

$$L2 = (2 \times CD2 + K\pi)/\alpha$$

where CD2 is the center distance between the measuring pulleys.

* * * * *